Jan. 7, 1958

H. D. EPSTEIN 2,819,365

SNAP-ACTING THERMOSTAT AND MOUNTING THEREFOR

Filed Nov. 26, 1954

Inventor,
Henry David Epstein,
by Townsend M. Gunn
Atty.

United States Patent Office 2,819,365
Patented Jan. 7, 1958

2,819,365

SNAP-ACTING THERMOSTAT AND MOUNTING THEREFOR

Henry David Epstein, Boston, Mass., assignor to Metals & Controls Corporation, Attleboro, Mass., a corporation of Massachusetts Application November 26, 1954, Serial No. 471,459

3 Claims. (Cl. 200—113)

This invention relates to thermostatic elements of the snap-acting type, and in particular to such elements which are inherently snap-acting.

The snap-motion of inherent snap-acting thermostat elements generally is preceded by a creep motion while the temperature of the element is changing to that temperature at which it has been calibrated to snap. The amount of this creep motion of the element, even though small, is undesirable in many cases, and steps must be taken to nullify it. This is oftentimes done by mechanically deforming the shape of the element by the amount it would itself deform during this creep motion. For example, in the case of the snap-acting elements familiarly known as Spencer snap-acting discs (such as described in United States Patent No. 1,448,240), this is done by mechanically lessening the amount of "dish" of the element. If the disc is restrained at its periphery, as by holding contacts in engagement, then the center of the disc may be pulled inwardly by means of an adjustable mounting screw, an amount equal to or greater than the amount the center of the disc would have crept. Furthermore, to regulate the temperature at which the snap-acting element will actually snap in a switch or other device, one method often used is to deform mechanically the element, as described above for the Spencer snap-acting disc.

However, sometimes the relationship between the temperature of response and the amount of such deformation of the snap-acting element is critical, and attempts to adjust the element to an exact temperature are therefore costly. Also, if a snap-acting element has been thus adjusted in a device such as the thermostatic switch shown in the accompanying drawings, and the contacts wear away due to electrical arcing, etc., then the effect is to change the amount of deformation or setting, and the switch may be thrown out of adjustment.

Therefore, it is desirable to have a mounting for a snap-acting element which will lessen (if not eliminate) the criticalness of the above-described setting, to remove creep of the element, and to adjust the operating temperature of the switch or other complete device; also one which will allow for some wear and tear in the device or its components without the operating temperature of the device changing an intolerable amount.

Another problem that is encountered in the use of snap-acting elements is where it is desired to lead electrical current into the body of the snap-acting element. This is true, for example, in connection with the so-called Spencer snap-acting discs. Ordinarily such discs are mounted somewhat loosely at the center by a mounting post. The purpose of the allowed looseness is to prevent binding of the thermostatic element. However, this looseness is not good from an electrical viewpoint. It would be better in some cases to be able to fasten the binding post solidly to the center of the snap-acting disc, either by a riveted assembly or by welding or soldering means.

Other problems connected with the use of such snap-acting devices are the getting of a desired wiping action of the contacts, and getting an increase in contact pressure (rather than a decrease) during the early part of a temperature change cycle.

This invention provides a solution for the above problems, and does so through the mounting means used for the snap-acting element.

Among the several objects, therefore, of this invention may be noted the provision of a snap-acting thermostatic element having an improved mounting means incorporated as an integral part of the element; the provision of a snap-acting thermostatic element having such improved mounting means and which is capable of effecting substantially simultaneous making and/or breaking of the electrical contacts of one pair with the respective contacts of another pair; the provision of a thermostatic element of the class described above, in which said improved mounting element has spring characteristics; the provision of a thermostatic switch embodying thermostatic elements of the class described above, and having mounting means such that wearing away of the electrical contacts may take place without intolerable change in the calibration of the switch; the provision of a snap-acting thermostat element to which mounting means, or electricity-conducting means may be tightly fastened without hindering the motion of the element; the provision of a snap-acting element incorporating mounting means such that an increase in contact pressure is obtained during part of a temperature change cycle; the provision of a snap-acting element incorporating means to provide a wiping action to contacts actuated by the element; and the provision of a snap-acting thermostat element which is simple and economical to make, and is readily and easily mounted and adjusted as to temperature.

Other objects and advantages of the invention will be in part obvious and in part pointed out hereinafter.

In the accompanying drawings, in which several of various possible embodiments of the invention are illustrated:

Similar reference characters indicate corresponding parts throughout the several views of the drawings.

Figure 1:
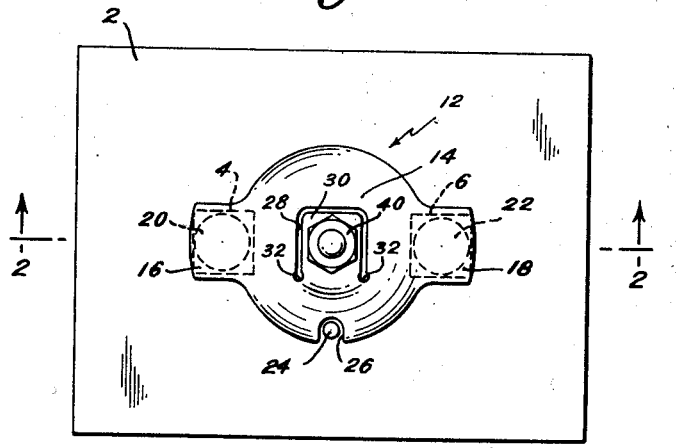
Fig. 1 is a plan view of one embodiment of this invention.

In Fig. 1, there is shown a simple switch which illustrates the principles of this invention and shows one operative embodiment of the snap-acting element of this invention. A base 2 of insulating material such as Bakelite or other molded synthetic electrically insulating resin is provided. (Of course, instead of having the whole base made of resin, a metal base could be provided with suitable insulating washers and grommets to insulate electrically various parts from each other in accordance with standard practice.) Mounted on base 2, as by the conventional screw-type terminals shown, are the electrical contacts 4 and 6. The lock nuts 8 and 10, respectively, serve to hold these contacts firmly to the base 2.

A thermostat element 12 is provided which in general resembles the thermostat elements shown in United States Patents 1,448,240 or 2,317,831. In the embodiment shown, the element shown in Patent 2,317,831 is the one used by way of example, but whether or not the thermostat element has the ears attached thereto is not a feature of this invention. Thermostat element 12, therefore, comprises the central dished portion 14, and the ears 16 and 18 which are integral parts of the disc 12 in accordance with said patent. Each of these ears carries an electrical contact, as indicated by, respectively, numerals 20 and 22. Contacts 20 and 22 are positioned on the thermostat element 12 so as to engage electrical contacts 4 and 6, respectively. A guide post 24 is mounted on base 2 and by means of its fitting into a notch 26 provided in the edge of the element, the latter is prevented from turning, and therefore, the respective electrical contacts are maintained in alignment.

It will be observed that a cut 28 is made about the center of the thermostat element so as to free a portion thereof and thus form the tongue 30 integrally out of the thermostat material from which the snap-acting element itself is made. It is a critical feature of this invention that the tongue is so positioned as to extend perpendicular to a line joining the contacts 20 and 22. That is, considering the tongue as a lever with its fulcrum at the place where it joins the body of the element, the plane of motion of the tongue lies perpendicular to said line joining these contacts. In this instance, the cut is made so that the tongue 30 is somewhat rectangular in shape. However, the cut 28 could be made so that tongue 30 could be some other shape if desired. It has been found, however, that the rectangularly shaped tongue shown in Fig. 1 serves the purpose of this invention admirably. It will be observed, also, that the cut 28 ends in each instance in the stress-relieving holes 32, the purpose of these being to prevent the material of the thermostatic disc from cracking beyond the ends of the cut.

A mounting hole 34 is provided in the tongue 30, and through this mounting hole is inserted the reduced end 36 of the mounting and adjusting post 38. The fit of the end 36 in the hole 34 may be a sliding one, and in such a case the customary shoulders and washer 40 are provided so that when the end 36 is headed over (as shown) the snap-acting element is held securely to the post 38, but not tight enough to bind the element immovably to the post. However, one of the advantages of the invention is that such shoulders may be eliminated, and the fit of the parts may be a tight one. Thus, the heading-over of the post can be done firmly enough to jam the washer 40 down against the top of the tongue 30. Or, alternatively, the post 38 can be welded or brazed to the tongue 30. In either way, an economical construction is provided, and a good electrical connection to the center of the element is made. The springy nature of the tongue prevents such a tight joint from interfering with the normal snap action of the device. Where a loose fit is provided, as first described, mounting post 38 engages the base 2 by means of the conventional thread 42, and by turning the post 38 in the base 2, more or less force is brought to bear, through the medium of tongue 30 and its resilience or spring action, on the snap-acting disc 12. Where the post 38 is firmly attached to the element, as by tight riveting, welding or brazing, other means can be used to pull the post into the base, such as by having the post 38 press fit or squeeze fit in the base. Or (and this leads to great economy), the post 38 can be molded into the base as an insert when the base itself is molded. The element can then be assembled to the base by welding the tongue 30 to the top of the pre-positioned post. Furthermore, the use of the welded or riveted construction permits the user of the device to have the option of passing current through it either by means of the center post and out through the contacts, or from one contact to the other.

Figure 2:
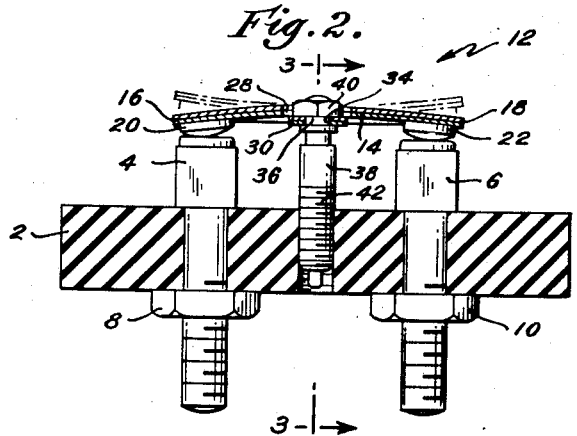
Fig. 2 is a side view of the Fig. 1 embodiment taken in the direction of sight lines 2—2 thereon.
Figure 3:
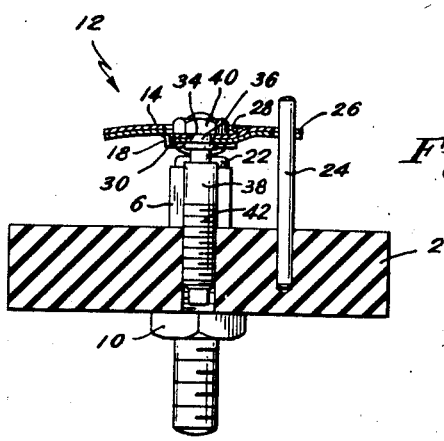
Fig. 3 is a side view of the Fig. 1 embodiment taken in the direction of sight lines 3—3 on Fig. 2.

It will be noticed that in Figs. 2 and 3, the disc has been shown in its adjusted position, with the result that the tongue 30 is shown as being depressed under the pull of the mounting post 38. The tongue, in turn, depresses the center of the disc. That is, the center of the element 12 is thus being forced in a creep-eliminating direction by the action of the resilient tongue 30.

Where a loose mounting is provided, conventional calibration procedure is followed such as, for example, heating the device in an appropriate heating fluid (such as oil or water) at the selected temperature, and then turning the mounting post 38 in the base 2 so as to depress the center of the disc to the point that it snaps. In this operation of adjustment, it will be found that because of the springy nature of tongue 30 and relationship of the spring rates of the tongue and the rest of the snap-acting element 12, the screw 38 can be turned a greater amount for a given change in the temperature of response of the snap-acting element than in the case where no tongue 30 is provided.

Where the welded or riveted construction is used, particularly where it is desired to mold the mounting post into the base as aforementioned, it will be found that the spring nature of the tongue 30 makes such a construction more feasible. This is because of the greater amount of physical movement of the tongue which is permissible for a given change in the calibration temperature of the element than is the case when no tongue is used. For example, assuming that the temperature calibrated tolerance of the switch is to be ±5° F., a snap-acting element of the Spencer type approximately 1 inch in diameter may be thrown outside of this tolerance by as little as .002 inch adjustment of the center of the disc toward or away from the base. Therefore, in the case of the prior art structures in which no tongue is used, the height of the top of the post above the base must also be kept within very narrow tolerance. However, with the use of the tongue 30, it will be found that the top of the post may vary in height as much as .015 inch and still have the disc within its proper operating tolerance.

It is also to be noted that because of the manner in which the tongue 30 is mounted in cantilever fashion to the body of the snap-acting element at one side of the center thereof, the tongue can act as a creep type thermostat metal strip, and the effect of this motion of the tongue 30 is to rock the element and its contacts 20 and 22 on the fixed contacts 4 and 6. Then when the element snaps, there is a slight but positive wiping action afforded between the respective contacts, which wiping action is influential in maintaining clean contact surfaces. In addition, this rocking action is of help in breaking any incipient sticking of the contacts together which may have been the result of a previous operation, and due to the shape of the contacts themselves, the rocking action will tend to increase contact pressure.

There are other forms of snap-acting elements to which the principles of this invention apply equally well, and in general it is to be noted that these are the snap-acting elements of the type that are made inherently snap-acting as by having a bowed or dished shape imparted thereto by a forming or crimping operation. To these devices, the tongued construction shown herein may be applied with beneficial results.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A snap-acting thermostat element having an initial creep motion followed by a snap-motion in response to temperature change; said element including a bowed portion and a mounting tongue; said bowed portion being formed of composite, thermally responsive material; a pair of electrical contacts carried by said bowed portion in diametrically opposed relation to each other; said tongue being carried at one end thereof by said bowed portion and extending from said end across and in a direction substantially perpendicular to a line joining said contacts; said direction, from one of the outer edges of said bowed portion, extending toward another outer edge thereof; said tongue being formed of composite, thermally responsive material; and the end of said tongue opposite from said one end being free to move relative to said bowed portion.

2. A snap-acting thermostat switch comprising a base, a first pair of spaced electrical contacts carried by said base; a supporting member carried by said base; a snap-acting element; said element including a snap-acting portion formed of composite, thermally responsive material and a cantilever mounting tongue; a second pair of electrical contacts; the contacts of said second pair being carried by the snap-acting portion of said element; one of the contacts of said second pair being disposed at each side of said tongue for cooperation with a respective one of the contacts of said first pair; said tongue being rigidly secured to said supporting member and being carried at one end thereof by the snap-acting portion of said element; said tongue extending from its said one end across and in a direction substantially perpendicular to a line joining said contacts; said direction, from one of the outer edges of said bowed portion, extending toward another outer edge thereof; said tongue being formed of composite, thermally responsive material; and the end of said tongue opposite from said one end being free to move relative to said bowed portion.

3. A snap-acting thermostat switch comprising: a base; a pair of stationary electrical contacts mounted on said base; a supporting post carried by said base and positioned between said stationary contacts; a snap-acting thermostat element; said element including a snap-acting bowed portion and means for mounting said element on said post; said bowed portion and said mounting means being formed of composite, thermally responsive material; a pair of electrical contacts carried by said bowed portion in diametrically opposed relation to each other; each of said last-named contacts being engageable and disengageable with one of said stationary contacts upon snap-motion of said element in corresponding opposite directions; said mounting means consisting of a tongue; said tongue being secured to said post and integral at one end thereof with said bowed portion; said tongue extending from said end across and in a direction substantially perpendicular to a line joining said contacts; said direction, from one of the outer edges of said bowed portion, extending toward another outer edge thereof; and the end of said tongue opposite from said one end being free to move relative to said bowed portion.

References Cited in the file of this patent

UNITED STATES PATENTS

| | | |
|---|---|---|
| 2,182,048 | Elmer | Dec. 5, 1939 |
| 2,266,537 | Elmer | Dec. 16, 1941 |
| 2,632,824 | Malone | Mar. 24, 1953 |
| 2,707,216 | Farison | Apr. 26, 1955 |

FOREIGN PATENTS

| | | |
|---|---|---|
| 560,434 | Great Britain | Apr. 4, 1944 |
| 677,161 | Great Britain | Aug. 13, 1952 |
| 691,167 | Great Britain | May 6, 1953 |